United States Patent
Hong et al.

(10) Patent No.: US 9,715,298 B2
(45) Date of Patent: Jul. 25, 2017

(54) FLEXIBLE DISPLAY DEVICE WITH SENSOR LAYER

(71) Applicant: SAMSUNG DISPLAY CO., LTD., Yongin, Gyeonggi-Do (KR)

(72) Inventors: Sung Su Hong, Seoul (KR); Sun A Yang, Suwon-si, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/798,826

(22) Filed: Jul. 14, 2015

(65) Prior Publication Data

US 2016/0216736 A1  Jul. 28, 2016

(30) Foreign Application Priority Data

Jan. 22, 2015 (KR) .......................... 10-2015-0010843

(51) Int. Cl.
*G06F 3/041* (2006.01)
*G06F 1/16* (2006.01)

(52) U.S. Cl.
CPC .......... *G06F 3/0412* (2013.01); *G06F 1/1652* (2013.01); *G06F 2203/04102* (2013.01)

(58) Field of Classification Search
CPC ................... G06F 1/1641; G06F 3/041; G06F 2203/04102; G06F 1/16
See application file for complete search history.

(56) References Cited

U.S. PATENT DOCUMENTS

| | | | |
|---|---|---|---|
| 9,287,329 B1* | 3/2016 | Lee | H01L 51/0097 |
| 2009/0289885 A1* | 11/2009 | Chao | H05K 1/147 |
| | | | 345/98 |
| 2010/0220072 A1* | 9/2010 | Chien | G06F 3/041 |
| | | | 345/173 |
| 2013/0169558 A1* | 7/2013 | Min | G06F 3/044 |
| | | | 345/173 |
| 2014/0062916 A1* | 3/2014 | Hong | G06F 3/041 |
| | | | 345/173 |
| 2014/0152912 A1* | 6/2014 | Lee | G06F 3/0412 |
| | | | 349/12 |
| 2015/0028328 A1* | 1/2015 | Ikeda | H01L 27/1218 |
| | | | 257/43 |
| 2015/0346877 A1* | 12/2015 | Justice | G06F 3/047 |
| | | | 345/173 |

FOREIGN PATENT DOCUMENTS

| | | |
|---|---|---|
| KR | 10-2013-0126007 A | 11/2013 |
| KR | 10-2014-0016709 A | 2/2014 |
| KR | 10-2014-0053628 A | 5/2014 |

* cited by examiner

*Primary Examiner* — MD Saiful A Siddiqui
(74) *Attorney, Agent, or Firm* — Lee & Morse, P.C.

(57) ABSTRACT

A flexible display device includes a flexible substrate including a first surface and a second surface on opposite sides of the flexible substrate, a display portion including thin film transistors located on the first surface of the flexible substrate, a sensor circuit located on the second surface of the flexible substrate, a first electrode pad on the flexible substrate, the first electrode pad being connected to a first wire drawn out from the display portion, and a second electrode pad on the flexible substrate, the second electrode pad being connected to a second wire drawn out from the sensor circuit. The first wire or the second wire includes a bridge passing through a through-hole in the flexible substrate.

15 Claims, 10 Drawing Sheets

FLEXIBLE DISPLAY DEVICE WITH SENSOR LAYER

CROSS-REFERENCE TO RELATED APPLICATION

Korean Patent Application No. 10-2015-0010843, filed on Jan. 22, 2015, in the Korean Intellectual Property Office, and entitled: "Flexible Display Device with Sensor Layer," is incorporated by reference herein in its entirety.

BACKGROUND

1. Field

Embodiments relate to a flexible display device that includes a flexible substrate that is bendable or rollable.

2. Description of the Related Art

Recently, flat panel displays have advanced rapidly, and various types of display devices that have a touch sensor and flexibility are commercially available. Such display devices recognize a portion touched by a user hand or a separate input device, and in response, a touch panel for transmitting separate information is provided outside of the display device.

SUMMARY

Embodiments are directed to a flexible display device including a flexible substrate including a first surface and a second surface on opposite sides of the flexible substrate, a display portion including thin film transistors located on the first surface of the flexible substrate, a sensor circuit located on the second surface of the flexible substrate, a first electrode pad on the flexible substrate, the first electrode pad being connected to a first wire drawn out from the display portion, and a second electrode pad on the flexible substrate, the second electrode pad being connected to a second wire drawn out from the sensor circuit. The first wire or the second wire includes a bridge passing through a through-hole in the flexible substrate.

The first electrode pad and the second electrode pad may be on a same one of the first surface and the second surface of the substrate.

The flexible substrate may include a display area that displays images and a pad region adjacent to the display area. The display portion and the sensor circuit may be located in the display area. The first electrode pad and the second electrode pad may be located in the pad region.

The through-hole may have a circular, elliptical, or polygonal planar shape.

The sensor circuit may include at least one of a touch sensor, a stylus sensor, a strain sensor, and a pressure sensor.

The flexible display device may further include a flexible printed circuit board having one end connected to the first electrode pad and the second electrode pad and a driving circuit board connected to another end of the flexible printed circuit board. The flexible printed circuit board may be a single flexible printed circuit board to which the first electrode pad and the second electrode pad are connected.

The flexible display device may further include a first flexible printed circuit board having one end connected to the first electrode pad, a second flexible printed circuit board having one end connected to the second electrode pad, and a driving circuit board connected to another end of the first flexible printed circuit board and another end of the second flexible printed circuit board.

Embodiments are also directed to a flexible display device including a flexible substrate including a display area and a pad region, and including a first surface and a second surface on opposite sides of the flexible substrate, a display portion in the display area of the first surface, the display portion including thin film transistors, a first sensor circuit laminated with the display portion in the display area of the first surface, an insulating layer between the display portion and the first sensor circuit, a first electrode pad in the pad region, the first electrode pad being connected to a first wire drawn out from the display portion, and a second electrode pad connected to a second wire drawn out from the first sensor circuit. The first wire or the second wire includes a first bridge inserted into a first through-hole that passes through the insulating layer.

The first electrode pad and the second electrode pad may be on a flat surface.

The first sensor circuit may be on the flexible substrate. The display portion may be on the first sensor circuit. The first wire may include the first bridge and may be connected to the first electrode pad through the first through-hole.

The flexible display device may further include a second sensor circuit on the second surface of the flexible substrate, and a third electrode pad on the first surface of the flexible substrate, the third electrode pad being connected to a third wire drawn out from the second sensor circuit. The third wire may include a second bridge inserted into a second through-hole that passes through the flexible substrate.

The display portion may be on the flexible substrate. The first sensor circuit may be on the display portion. The second wire may include the first bridge and may be connected to the second electrode pad through the first through-hole.

The flexible display device may further include a second sensor circuit in a display area of the second surface of the flexible substrate and a third electrode pad on the first surface of the flexible substrate, the third electrode pad being connected to the third wire drawn out from the second sensor circuit. The third wire may include a second bridge inserted into a second through-hole that passes through the flexible substrate.

The through-hole may have a circular, elliptical, or polygonal planar shape.

The sensor circuit may include at least one of a touch sensor, a stylus sensor, a strain sensor, and a pressure sensor.

The flexible display device may further include a flexible printed circuit board having one end connected to the first electrode pad and the second electrode pad and a driving circuit board connected to an other end of the flexible printed circuit board. The flexible printed circuit board may be a single flexible printed circuit board to which the first electrode pad and the second electrode pad are connected.

The flexible display device may further include a first flexible printed circuit board having one end connected to the first electrode pad, a second flexible printed circuit board having one end connected to the second electrode pad, and a driving circuit board connected to another end of the first flexible printed circuit board and another end of the second flexible printed circuit board.

The insulating layer may include a protrusion region that protrudes beyond the display portion and the first sensor circuit in a direction along the flexible substrate. The first through-hole may be located in the protrusion region.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
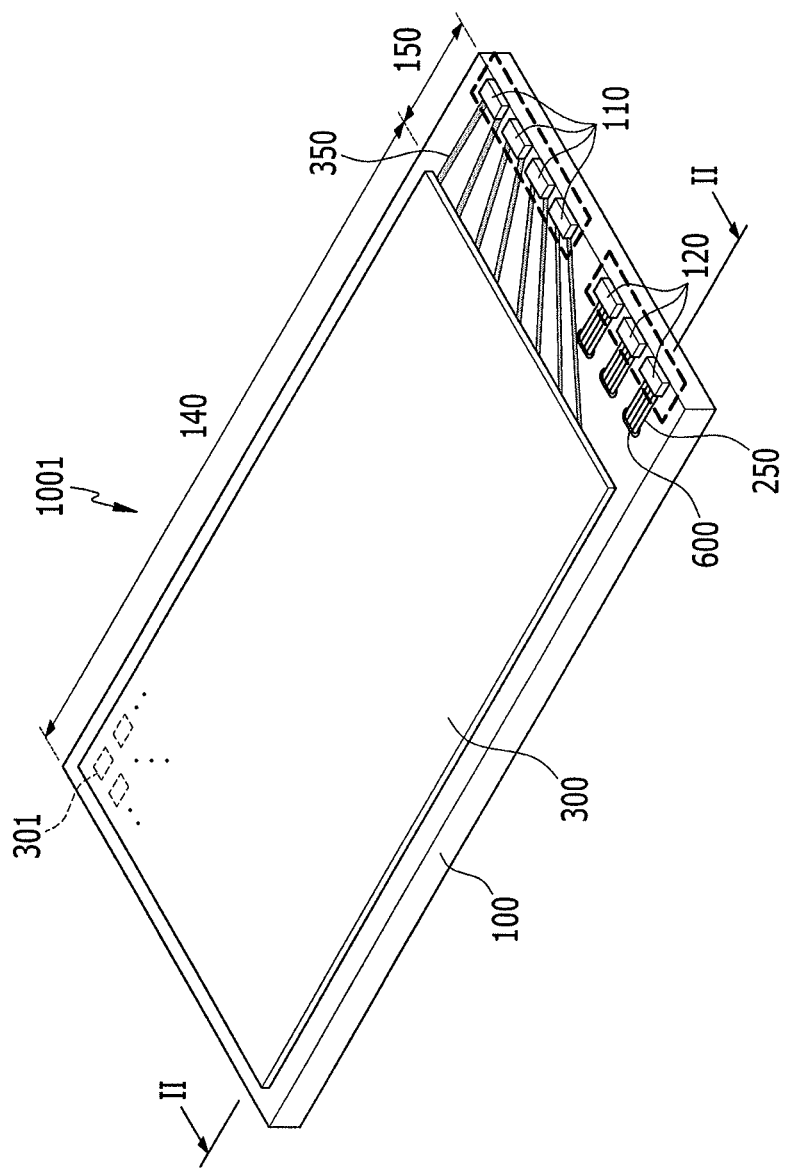
FIG. 1 illustrates a perspective view of a display device according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "between" two layers, it can be the only layer between the two layers, or one or more intervening layers may also be present. Like reference numerals refer to like elements throughout.

A display device according to a an exemplary embodiment will now be described with reference to FIGS. 1, 2, and 3.

FIG. 1 illustrates a perspective view of a display device according to an exemplary embodiment. FIG. 2 illustrates a cross-sectional view of FIG. 1 taken along line II-II, and FIG. 3 illustrates a perspective view of the display device shown in FIG. 1 viewed from the bottom.

Figure 2:
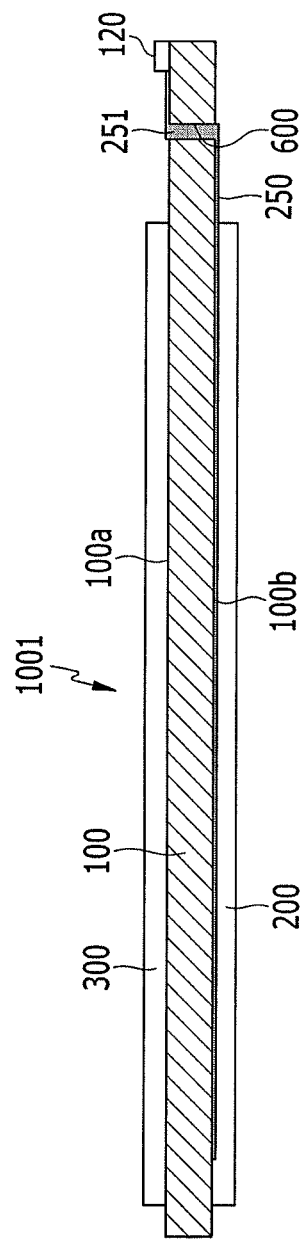
FIG. 2 illustrates a cross-sectional view of FIG. 1 taken along line II-II.
Figure 3:
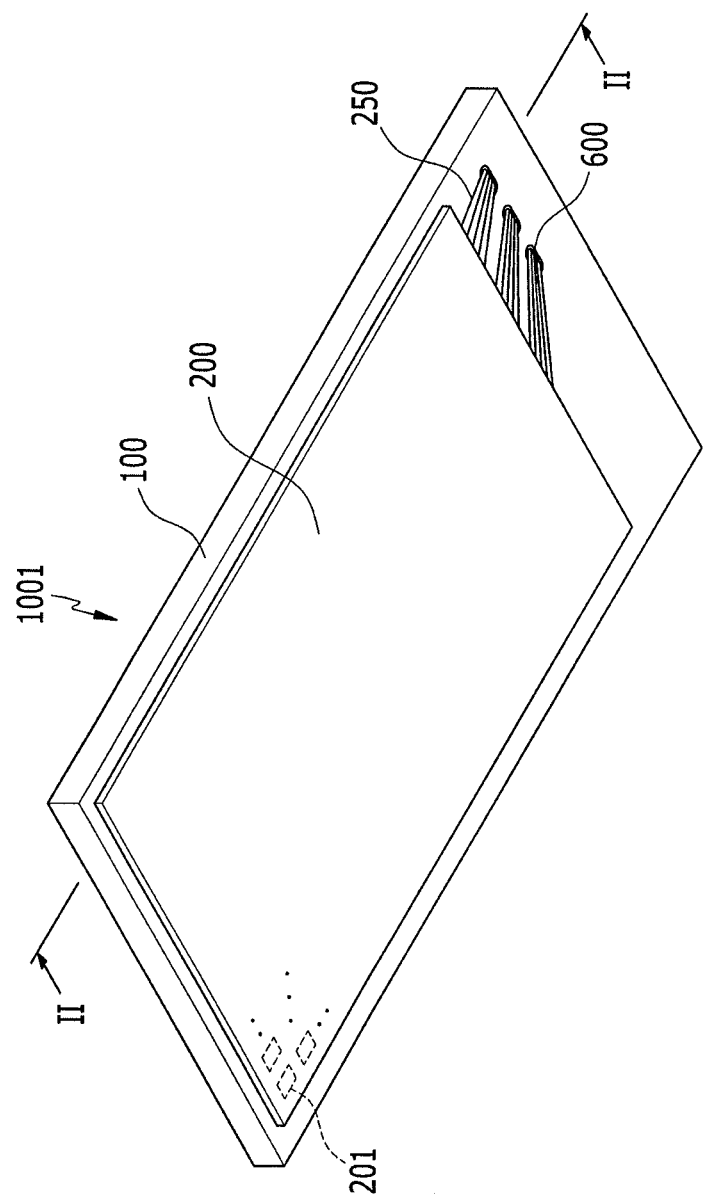
FIG. 3 illustrates a perspective view of the display device shown in FIG. 1 viewed from the bottom.

Referring to FIGS. 1, 2, and 3, a flexible display device 1001 according to this exemplary embodiment may be formed as a liquid crystal display including a liquid crystal or an organic light emitting device including an organic light emitting diode. The flexible display device 1001 may be applied to a mobile phone, a stylus sensor, a strain sensor, a PDA, a laptop, a monitor, a TV, or the like.

The flexible display device 1001 may include a flexible substrate 100 including a display area 140 and a pad region 150, a display portion 300 formed on a first surface 100a of the flexible substrate 100 and including thin film transistors 301, a sensor circuit 200 formed on a second surface 100b of the flexible substrate 100, first electrode pads 110 formed on the flexible substrate 100 and connected to the display portion 300, and second thin film electrode pads 120 formed on the flexible substrate 100 and connected to the sensor circuit 200.

The flexible substrate 100 may have a planar rectangular shape, and may be formed as a bendable and flexible structure. The flexible substrate 100 may include a suitable bendable material. For example, the flexible substrate 100 may include at least one of a polymer material such as polyimide, a metal material, and an inorganic material. In some implementations, the flexible substrate 100 may have a film shape.

The flexible substrate 100 may include the display area 140 that displays images, and the pad region 150, which is formed at the outer side of the display area 100 and in which the electrode pads 110 and 120 are disposed. The display area 140 may be a region in which thin film transistors and light-emitting elements are disposed. The display area 100 may display images depending on predetermined driving signals. The pad region 150 may be a region in which electrode pads and wires are disposed. The pad region 150 may not display images.

The flexible substrate 100 may include the first surface 100a and the second surface 100b on opposite sides of the flexible substrate 100 and facing in opposite directions from each other. The first surface 100a may be a front surface that displays images, and the second surface 100b may be a rear surface facing the first surface 100a.

The display portion 300 may be formed on the first surface 100a, and the sensor circuit 200 may be formed on the second surface 100b of the flexible substrate 100. The display portion 300 and the sensor circuit 200 may be formed by deposition or etching on the flexible substrate 100. The plurality of thin film transistors 301 may be formed in a predetermined pattern on the display portion 300, and a plurality of touch sensors 201 may be formed in a predetermined pattern on the sensor circuit 200. In addition, organic light emitting elements or liquid crystals for forming pixels may be disposed on the display portion 300. The thin film transistors 301 may be connected to the organic light emitting elements, and may control and drive the organic light emitting elements depending on signals inputted to the organic light emitting elements.

The display portion 300 may be connected to the first electrode pads 110 disposed on the first surface 100a through first wires 350. The first wires 350 may be elongated and may extend from the pad region 150 to the display area 140 to be connected to the thin film transistors 301.

The sensor circuit 200 may be formed on the second surface 100b, and may include the plurality of sensors 201. The sensors 201 may be disposed in a predetermined lattice form. The sensors 201 may form a touch sensor, a stylus sensor, a strain sensor, or a pressure sensor.

The sensor circuit 200 may be connected to the second electrode pads 120 disposed on the first surface 100a through second wires 250. The first electrode pads 110 and the second electrode pads 120 may be disposed on the same surface. The second electrode pads 120 and the sensor circuit 200 may be disposed on different surfaces. The second wires 250 may be elongated and may extend from the pad region 150 to the display area 140 to be connected to the sensors 201.

Through-holes 600 may be formed in the flexible substrate 100. The second wires 250 may include bridges 251 inserted into the through-holes 600 to pass through the through-holes 600. The through-holes 600 may be formed with a circular, elliptical, or polygonal cross-section. At least one or more of the through-holes 600 may be formed in the flexible substrate 100. The through-holes 600 may be formed by a laser or etching process.

A plurality of bridges 251 may be inserted into one through-hole 600. The bridges 251 may be formed in a predetermined pattern to be spaced apart from each other. The bridges 251 may be formed by an etching process.

The second wires 250 may be elongated and may extend from the second surface 100b to the first surface 100a by way of the bridges 251. The second wires 250 may connect the sensor circuit 200 formed on the second surface 100b and the second electrode pads 120 formed on the first surface 100a.

The first wires 350 may be formed only on the first surface 100a.

Figure 4:
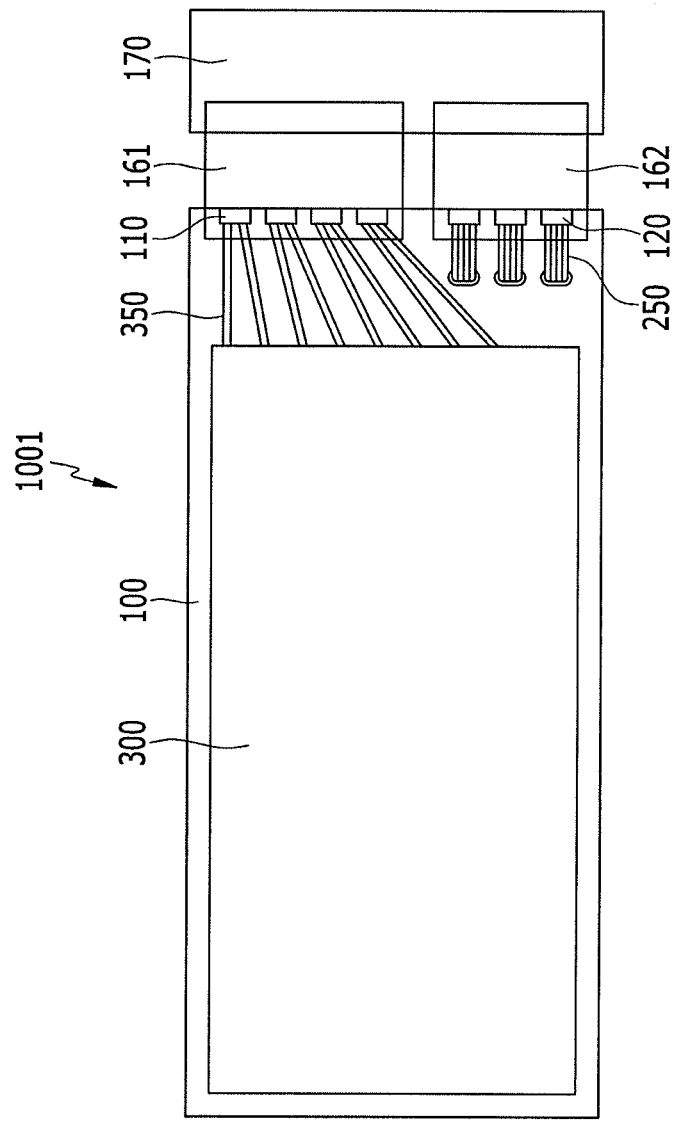
FIG. 4 illustrates a top plan view depicting a flexible printed circuit board (PCB) and a driving circuit board connected to an electrode pad of the display device illustrated in FIG. 1.

FIG. 4 illustrates a top plan view depicting a flexible printed circuit board (PCB) and a driving circuit board connected to an electrode pad of the display device illustrated in FIG. 1.

Referring to FIG. 4, a first flexible printed circuit board (FPCB) 161 may be connected to the first electrode pad 110, and a second flexible printed circuit board 162 may be connected to the second electrode pads 120. In addition, a driving circuit board 170 may be connected to the first flexible printed circuit board 161 and the second flexible printed circuit board 162.

The first flexible printed circuit board 161 may connect the first electrode pads 110 and the driving circuit board 170. The second flexible printed circuit board 162 may connect the second electrode pads 120 and the driving circuit board 170. The driving circuit board 170 may generate driving signals and transmit the driving signals to the thin film transistors 301. The driving circuit board 170 may also receive signals generated at the sensors 201 and may generate signals for driving a screen.

The first electrode pads 110 may be connected to one end of the first flexible printed circuit board 161, and the driving circuit board 170 may be connected to the other end of the first flexible printed circuit board 161. In addition, the second electrode pads 120 may be connected to one end of the second flexible printed circuit board 162, and the driving circuit board 170 may be connected to the other end of the second flexible printed circuit board 162.

When the number of output terminals of the flexible printed circuit board is smaller than the number of terminals of the first electrode pads and the second electrode pads, a plurality of flexible printed circuit boards may be connected to the flexible substrate.

As described above, according to this exemplary embodiment, a thin film transistor pattern and a sensor circuit pattern may be formed by etching on opposing sides of the flexible substrate 100. Accordingly, the substrate on which the sensor circuit is formed need not be attached to the substrate on which the thin film transistors are formed. Accordingly the manufacturing process may be simplified and flexibility of the display device may be improved.

In addition, if the electrode pads were to be formed on different layers, a structure of the display device and a process for connecting the flexible printed circuit board and the flexible substrate could become complicated. In the present exemplary embodiment, wires that are drawn out may be connected on the same surface. Accordingly, an arrangement structure of the wires may be simplified.

A display device according to another exemplary embodiment will now be described with reference to FIGS. 5 and 6.

Parts that are different from the previous exemplary embodiment will be described, and parts that are not described may be the same as in the previous exemplary embodiment. For better comprehension and ease of description, the constituent elements of this exemplary embodiment that are the same as those of the previous exemplary embodiment will have the same reference numerals.

Figure 5:
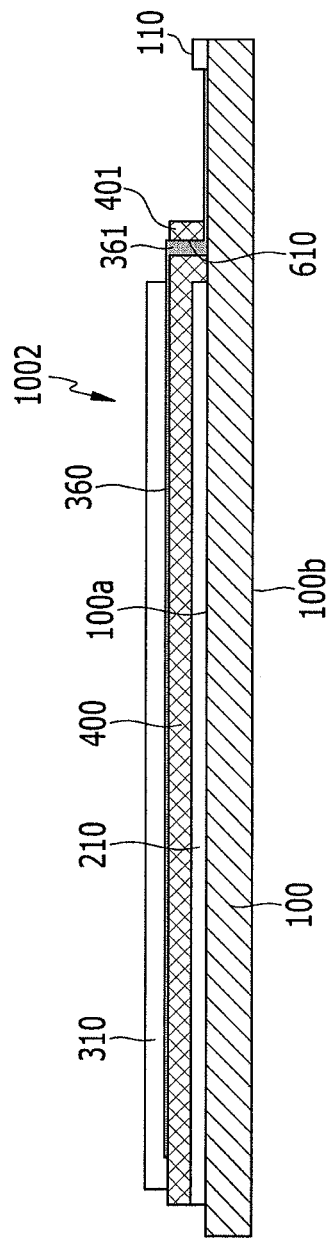
FIG. 5 illustrates a cross-sectional view depicting a connection state of a display portion and a first electrode pad in a display device according to another exemplary embodiment.
Figure 6:
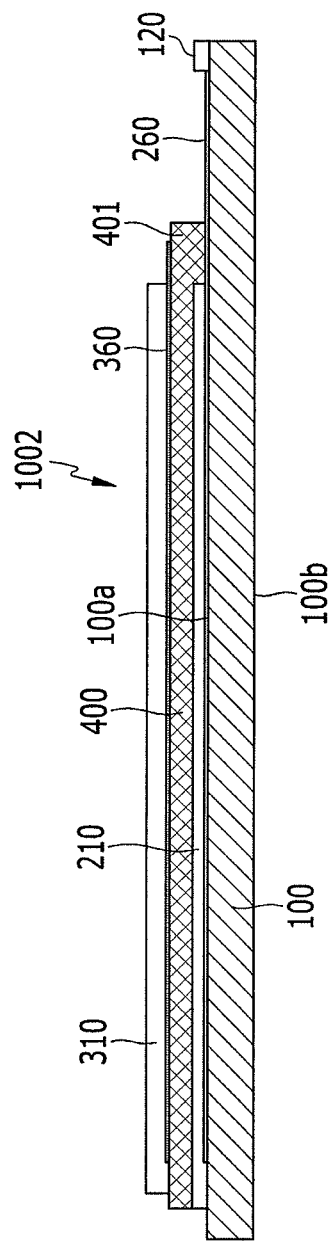
FIG. 6 illustrates a cross-sectional view depicting a connection state of a sensor circuit and a second electrode pad in the display device according to the embodiment illustrated in FIG. 5.

FIG. 5 illustrates a cross-sectional view depicting a connection state of a display portion and a first electrode pad in a display device according to this exemplary embodiment, and FIG. 6 illustrates a cross-sectional view depicting a connection state of a sensor circuit and a second electrode pad in the display device according to this exemplary embodiment.

Referring to FIGS. 5 and 6, a flexible display device 1002 according to this exemplary embodiment includes a flexible substrate 100, a sensor circuit 210 formed on the flexible substrate 100, a display portion 310 including thin film transistors formed on the sensor circuit 210, an insulating layer 400 formed between the sensor circuit 210 and the display portion 310, first electrode pads 110 connected to the display portion 310, and second electrode pads 120 connected to the sensor circuit 210.

The flexible substrate 100 may have a planar rectangular shape, and may be formed as a bendable and flexible structure. The flexible substrate 100 may include a display area that displays images, and a pad region, which is formed at the outer side of the display area and in which the electrode pads are disposed. In addition, the flexible substrate 100 may include a first surface 100a and a second surface 100b facing in opposite directions from each other on opposite sides of the flexible substrate 100. The first surface 100a may be a front surface displaying images, and the second surface 100b may be a rear surface facing the first surface 100a.

The display portion 310 and the sensor circuit 210 may be disposed in the display area that displays images, and the first electrode pads 110 and the second electrode pads 120 may be disposed in the pad region. Both display portion 310 and the sensor circuit 210 may be formed on the first surface 100a as a laminated structure. The sensor circuit 210 may be disposed to directly contact the flexible substrate 100, and the display portion 310 may be disposed on the sensor circuit 210.

A plurality of thin film transistors 301 may be formed in a predetermined pattern in the display portion 300, and a plurality of touch sensors 201 may be formed in a predetermined pattern in the sensor circuit 210. The display portion 310 may be connected to the first electrode pads 110 through a first wire 360, and the sensor circuit 210 may be connected to the second electrode pads 120 through the second wires 260. The first electrode pads 110 and the second electrode pads 120 may be disposed on the first surface 100a.

The insulating layer 400 may be interposed between the display portion 310 and the sensor circuit 210 to insulate the display portion 310 and the sensor circuit 210. A protrusion region 401 may protrude outward beyond the display portion 310. The display portion 310 may be formed on the insulating layer 400, and a through-hole 610 may be formed in the protrusion region 401. At least one or more through-holes 610 may be formed in the protrusion region 401. The through-hole 610 may be formed with a circular, elliptical, or polygonal cross-section. The through-hole 610 may be formed by a laser or etching process.

The first wire 360 may include a bridge 361 that is inserted into the through-hole 610 to pass through the through-hole 610. The first wire 360 may be elongated and may extend from the insulating layer 400 to the flexible substrate 100. Accordingly, the display portion 310 and the first electrode pad 110, which are disposed on different surfaces, may be connected to each other by the first wire 360.

The second wires 260 may be elongated and may extend from the pad region to the display area to be connected to the sensors of the sensor circuit 210.

A display device according to a another exemplary embodiment will now be described with reference to FIGS. 7 and 8.

Parts that are different from the previous exemplary embodiment will be described, and parts that are not described may be the same as in the previous exemplary embodiment. For better comprehension and ease of description, the constituent elements of this exemplary embodiment that are the same as those of the previous exemplary embodiment will have the same reference numerals.

Figure 7:
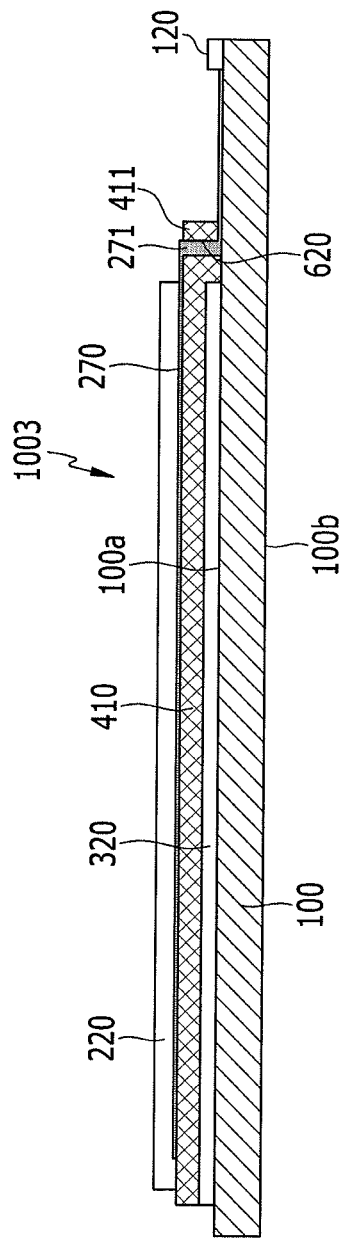
FIG. 7 illustrates a cross-sectional view depicting a connection state of a sensor circuit and a second electrode pad in a display device according to another embodiment.
Figure 8:
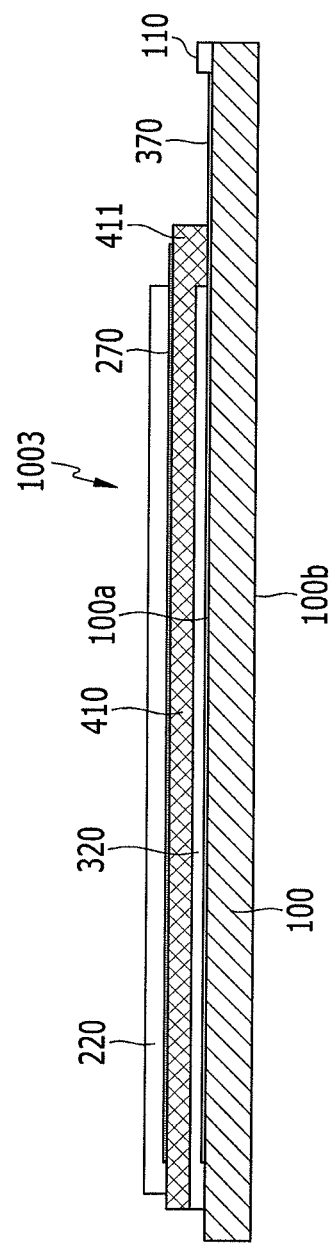
FIG. 8 illustrates a cross-sectional view depicting a connection state of a display portion and a first electrode pad in the display device according to the embodiment illustrated in FIG. 7.

FIG. 7 illustrates a cross-sectional view depicting a connection state of a sensor circuit and a second electrode pad in a display device according to this exemplary embodiment, and FIG. 8 illustrates a cross-sectional view depicting a connection state of a display portion and a first electrode pad in the display device according to this exemplary embodiment.

Referring to FIGS. 7 and 8, a flexible display device 1003 according to this exemplary embodiment includes a flexible substrate 100, a display portion 320 formed on the flexible substrate 100 and including thin film transistors, a sensor circuit 220 formed on the display portion 320, an insulating layer 410 formed between the display portion 320 and the sensor circuit 220, first electrode pads 110 connected to the display portion 320, and second electrode pads 120 connected to the sensor circuit 220.

The flexible substrate 100 may have a planar rectangular shape and may be formed as a bendable and flexible structure. The flexible substrate 100 may include a display area that displays images and a pad region in which the electrode pads are disposed. In addition, the flexible substrate 100 may include a first surface 100*a* and a second surface 100*b* facing in opposite directions from each other on opposite sides of the flexible substrate. The first surface 100*a* may be a front surface that displays images, and the second surface 100*b* may be a rear surface facing the first surface 100*a*.

The display portion 320 and the sensor circuit 220 may be disposed in the display area, and the first electrode pads 110 and the second electrode pads 120 may be disposed in the pad region. Both display portion 320 and the sensor circuit 220 may be formed on the first surface 100*a* in a laminated structure. The display portion 320 may be disposed to directly contact the flexible substrate 100, and the sensor circuit 220 may be disposed on the display portion 320.

A plurality of thin film transistors 301 may be formed in a predetermined pattern on the display portion 320, and a plurality of touch sensors 201 may be formed in a predetermined pattern on the sensor circuit 220. The display portion 320 may be connected to the first electrode pads 110 through the first wires 370, and the sensor circuit 220 may be connected to the second electrode pads 120 through second wires 270. The first electrode pads 110 and the second electrode pads 120 may be disposed on the first surface 100*a*.

An insulating layer 410 may be interposed between the display portion 320 and the sensor circuit 220 to insulate the display portion 320 and the sensor circuit 220. A protrusion region 411 of the insulating layer 410 may protrude beyond the display portion 320, and the sensor circuit 220 may be formed on the insulating layer 410. A through-hole 620 may be formed in the protrusion region 411. At least one or more through-holes 620 may be formed in the protrusion region 411.

The second wires 270 may include a bridge 271 that is inserted into the through-hole 620 to pass through the through-hole 620. The second wires 270 may be elongated and may extend from the insulating layer 410 to the flexible substrate 100. The second wires 270 may connect the sensor circuit 220 and the second electrode pads 120, which are disposed on different surfaces. The first wires 370 may connect the first electrode pads 110 and the display portion 320 on the flexible substrate. The first wires 370 may be formed to be elongated and may extend from the pad region to the display area.

A display device according to another exemplary embodiment will now be described with reference to FIGS. 9 and 10.

Parts that are different from the previous exemplary embodiment will be described, and parts that are not described may be the same as in the previous exemplary embodiment. For better comprehension and ease of description, the constituent elements of the this exemplary embodiment that are the same those of as the previous exemplary embodiment will have the same reference numerals.

Figure 9:
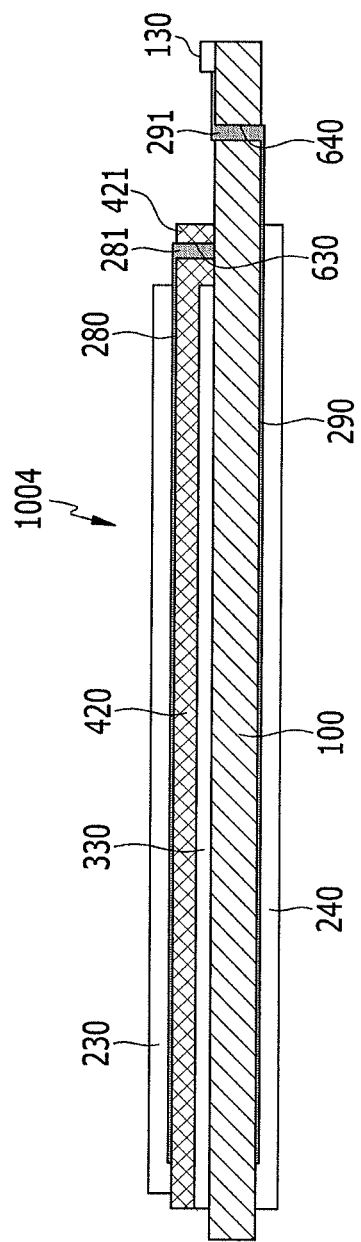
FIG. 9 illustrates a cross-sectional view of a display device according to another exemplary embodiment.
Figure 10:
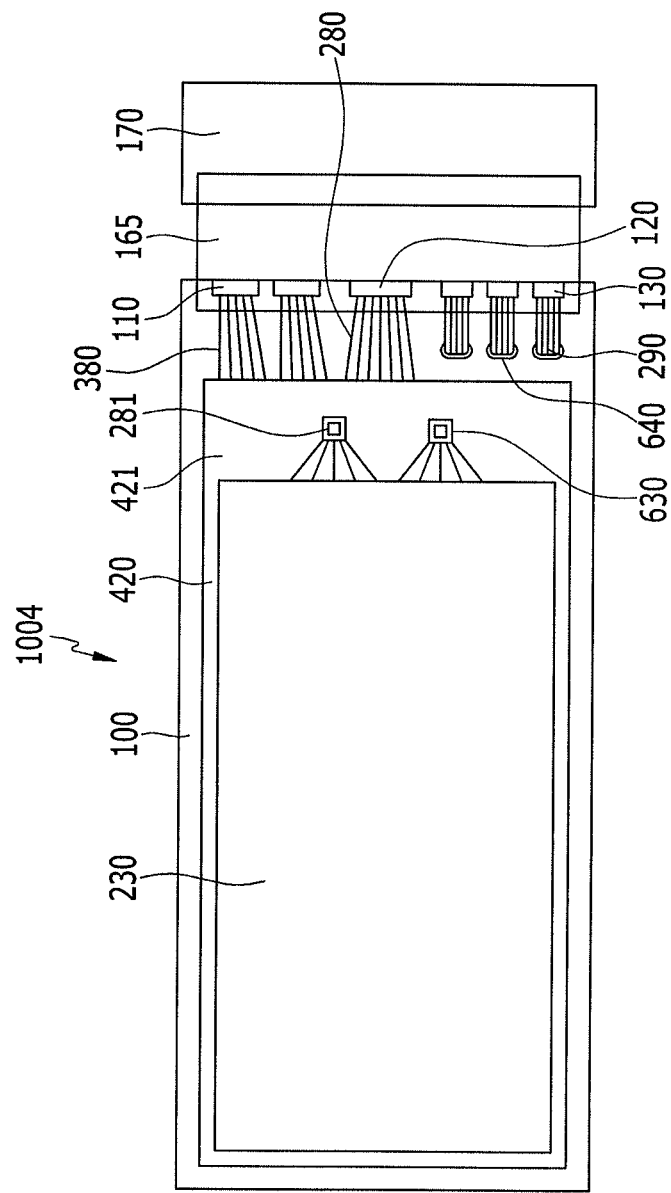
FIG. 10 illustrates a top plan view depicting a flexible printed circuit board and a driving circuit board connected to an electrode pad of the display device illustrated in FIG. 9.

FIG. 9 illustrates a cross-sectional view of a display device according to this exemplary embodiment, and FIG. 10 illustrates a top plan view depicting a flexible printed circuit board and a driving circuit board connected to an electrode pad of the display device shown in FIG. 9.

Referring to FIGS. 9 and 10, a flexible display device 1004 according to this exemplary embodiment may include a flexible substrate 100, a display portion 330 formed on a first surface 100*a* of the flexible substrate 100 and including thin film transistors, a first sensor circuit 230 formed on the display portion 330, an insulating layer 420 formed between the display portion 330 and the first sensor circuit 230, a second sensor circuit 240 formed on a second surface 100*b* of the flexible substrate 100, first electrode pads 110 connected to the display portion 330, second electrode pads 120 connected to the first sensor circuit 230, and third electrode pads 130 connected to the second sensor circuit 240.

The flexible substrate 100 may have a planar rectangular shape, and may be formed as a bendable and flexible structure. The flexible substrate 100 may include a display area that displays images and a pad region in which the electrode pads are disposed. The flexible substrate 100 may include a first surface 100*a* and a second surface 100*b* facing in opposite directions from each other on opposite sides of the flexible substrate 100. The first surface 100*a* may be a front surface displaying images, and the second surface 100*b* may be a rear surface facing the first surface 100*a*.

The display portion 330, the first sensor circuit 230, and the second sensor circuit 240 may be disposed in the display area, and the first electrode pads 110, the second electrode pads 120, and the third electrode pads 130 may be disposed in the pad region. The display portion 330 and the first sensor circuit 230 may be formed on the first surface 100*a* as a laminated structure. The second sensor circuit 240 may be disposed on the second surface 100b.

The display portion 330 may be disposed to directly contact the flexible substrate 100, and the first sensor circuit 230 may be disposed on the display portion 330, as an example. In other implementations, the first sensor circuit 230 may be disposed on the flexible substrate 100 and the display portion 330 may be disposed on the first sensor circuit 230 with the insulating layer 420 therebetween. A plurality of thin film transistors 301 may be formed in a predetermined pattern on the display portion 330, and a plurality of touch sensors 201 may be formed in a predetermined pattern on the second sensor circuit 240.

The display portion 330 may be connected to the first electrode pad 110 by first wires 380, and the first sensor circuit 230 may be connected to the second electrode pads 120 by second wires 280. The second sensor circuit 240 may be connected to the third electrode pads 130 by third wires 290. The first electrode pad 110, the second electrode pad 120, and the third electrode pad 130 may be disposed on the same plane of the first surface 100a.

The insulating layer 420 may be interposed between the display portion 330 and the first sensor circuit 230 to insulate the display portion 330 from the first sensor circuit 230. A protrusion region 421 may protrude outwardly beyond the display portion 330. The first sensor circuit 230 may be formed on the insulating layer 420, and a through-hole 630 may be formed in the protrusion region 421. At least one or more first through-holes 630 may be formed in the protrusion region 421.

The second wire 280 may include a first bridge 281 that is inserted into the first through-hole 630 to pass through the first through-hole 630. The second wire 280 may be elongated and may extend from the insulating layer 420 to the flexible substrate 100. The second wire 280 may connect the first sensor circuit 230 and the second electrode pad 120, which are disposed on different surfaces. The first wire 380 may connect the first electrode pad 110 and the display portion 330 on the flexible substrate. The first wire 380 may be formed to be elongated and may extend from the pad region to the display area.

A second through-hole 640 may be formed in the flexible substrate 100. The third wire 290 may include a second bridge 291 that is inserted into the second through-hole 640 to pass through the second through-hole 640. A plurality of second bridges 291 may be inserted into one second through-hole 640. The second bridges 291 may be formed in the second through-hole 640 in a predetermined pattern to be separated from each other.

The third wire 290 may be elongated and may extend from the second surface 100b to the first surface 100a by way of the bridge 291. The second sensor circuit 240 formed on the second surface 100b and the third electrode pad 130 formed on the first surface 100a may be connected by way of the bridge 291.

As shown in FIG. 10, a flexible printed circuit board 165 may be connected to the flexible substrate 100, and the driving circuit board 170 may be connected to the flexible printed circuit board 165.

The first electrode pad 110, the second electrode pad 120, and the third electrode pad 130 may be connected to one end of the flexible printed circuit board 165, and the driving circuit board 170 may be connected to the other end of the flexible printed circuit board 165. The driving circuit board 170 may generate driving signals and transmit the driving signals to the thin film transistors 301. The driving circuit board 170 may receive signals generated at the sensors 201 and may generate signals for driving a screen. The driving circuit board 170 may be formed as various types such as a printed circuit board (PCB), a chip on glass (COG), or the like.

As shown in the this exemplary embodiment, when the first electrode pad 110, the second electrode pad 120, and the third electrode pad 130 are disposed on the same surface, all of the first electrode pad 110, the second electrode pad 120, and the third electrode pad 130 may be connected in one flexible printed circuit board (PCB) 165.

By way of summation and review, a circuit for a touch sensor may be formed on a film, and the film may be attached with an adhesive on an upper portion and a lower portion of a substrate on which thin film transistors are formed. In this case, thickness of the substrate increases, and resistance against bending or rolling increases due to the adhesive, thereby decreasing flexibility of the substrate. Further, in this case, since the circuit for the touch sensor and a driving circuit for a display portion are separately connected, substrates may be separately required for two circuits, and a space on which a flexible printed circuit board for connecting the substrates is mounted is required, thus integration and simplification of the circuit in the display device may be difficult.

Embodiments provide a flexible display device that may improve flexibility thereof, and optimize wires of a display portion and a sensor circuit and configuration of a substrate. According to embodiments, it is possible to decrease thickness of the flexible display device by forming the sensor circuit and the display portion on one substrate. In addition, it is possible to omit an adhesive for attachment of a film layer such that flexibility may be improved by removing resistance due to the adhesive.

Further, it is possible to simplify and integrate the flexible display device by disposing wires connected to the display portion, wires connected to the sensor circuit, and electrodes on the same surface.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A flexible display device, comprising:
   a flexible substrate including a first surface and a second surface at opposite sides of the flexible substrate;
   a display portion including thin film transistors located on the first surface of the flexible substrate;
   a sensor circuit located on the second surface of the flexible substrate;
   a first electrode pad on the flexible substrate, the first electrode pad being connected to a first wire drawn out from the display portion; and
   a second electrode pad on the flexible substrate, the second electrode pad being connected to a second wire drawn out from the sensor circuit;

a flexible printed circuit board having one end connected to the first electrode pad and the second electrode pad; and a driving circuit board connected to another end of the flexible printed circuit board, wherein:

the first wire or the second wire includes a bridge passing through a through-hole in the flexible substrate, the flexible substrate includes a display area that displays images and a pad region adjacent to the display area such that a pad region facing edge of the display portion defines a boundary between the display area and the pad region, the display portion and the sensor circuit are located in the display area, the first electrode pad, the second electrode pad, and the through-hole are located in pad region, the flexible substrate directly contacts the display portion and the sensor circuit, and the flexible printed circuit board is a single flexible printed circuit board to which the first electrode pad and the second electrode pad are connected.

2. The flexible display device as claimed in claim 1, wherein:

the first electrode pad and the second electrode pad are on a same one of the first surface and the second surface of the substrate.

3. The flexible display device as claimed in claim 1, wherein:

the through-hole has a circular, elliptical, or polygonal planar shape.

4. The flexible display device as claimed in claim 1, wherein:

the sensor circuit includes at least one of a touch sensor, a stylus sensor, a strain sensor, and a pressure sensor.

5. The flexible display device as claimed in claim 1, further comprising:

a first flexible printed circuit board having one end connected to the first electrode pad;

a second flexible printed circuit board having one end connected to the second electrode pad; and a driving circuit board connected to another end of the first flexible printed circuit board and another end of the second flexible printed circuit board.

6. A flexible display device, comprising:

a flexible substrate including a display area and a pad region, and including a first surface and a second surface at opposite sides of the flexible substrate;

a display portion in the display area of the first surface such that a pad region facing edge of the display portion defines a boundary between the display area and the pad region, the display portion including thin film transistors;

a first sensor circuit laminated with the display portion in the display area of the first surface;

an insulating layer between the display portion and the first sensor circuit, the insulting layer directly contacting the display portion and the first sensor circuit;

a first elects ode pad in the pad region, the first electrode pad being connected to a first wire drawn out from the display portion;

a second electrode pad connected to a second wire drawn out from the first sensor circuit;

a flexible printed circuit board having one end connected to the first electrode pad and the second electrode pad; and a driving circuit board connected to an other end of the flexible printed circuit board, wherein:

the first wire or the second wire includes a first bridge inserted into a first through-hole that passes through the insulating layer, the first electrode pad, the second electrode pad, and the first through-hole are located in the pad region, the flexible printed circuit board is a single flexible printed circuit board to which the first electrode pad and the second electrode pad are connected.

7. The flexible display device as claimed in claim 6, wherein:

the first electrode pad and the second electrode pad are on a flat surface.

8. The flexible display device as claimed in claim 6, wherein the first sensor circuit is on the flexible substrate, the display portion is on the first sensor circuit, and the first wire includes the first bridge and is connected to the first electrode pad through the first through-hole.

9. The flexible display device as claimed in claim 8, further comprising:

a second sensor circuit on the second surface of the flexible substrate; and a third electrode pad on the first surface of the flexible substrate, the third electrode pad being connected to a third wire drawn out from the second sensor circuit, wherein the third wire includes a second bridge inserted into a second through-hole that passes through the flexible substrate.

10. The flexible display device as claimed in claim 6, wherein the display portion is on the flexible substrate, the first sensor circuit is on the display portion, and the second wire includes the first bridge and is connected to the second electrode pad through the first through-hole.

11. The flexible display device as claimed in claim 10, further comprising:

a second sensor circuit in a display area of the second surface of the flexible substrate; and a third electrode pad on the first surface of the flexible substrate, the third electrode pad being connected to the third wire drawn out from the second sensor circuit, wherein the third wire includes a second bridge inserted into a second through-hole that passes through the flexible substrate.

12. The flexible display device as claimed in claim 6, wherein the first through-hole has a circular, elliptical, or polygonal planar shape.

13. The flexible display device as claimed in claim 6, wherein the first sensor circuit includes at least one of a touch sensor, a stylus sensor, a strain sensor, and a pressure sensor.

14. The flexible display device as claimed in claim 6, further comprising:

a first flexible printed circuit board having one end connected to the first electrode pad;

a second flexible printed circuit board having one end connected to the second electrode pad; and a driving circuit board connected to another end of the first flexible printed circuit board and an other end of the second flexible printed circuit board.

15. The flexible display device as claimed in claim 6, wherein:
- the insulating layer includes a protrusion region that protrudes beyond the display portion and the first sensor circuit in a direction along the flexible substrate, and
- the first through-hole is located in the protrusion region.

* * * * *